L. WILKINSON.
Tire Upsetting.
No. 70,664. Patented Nov. 5, 1867.
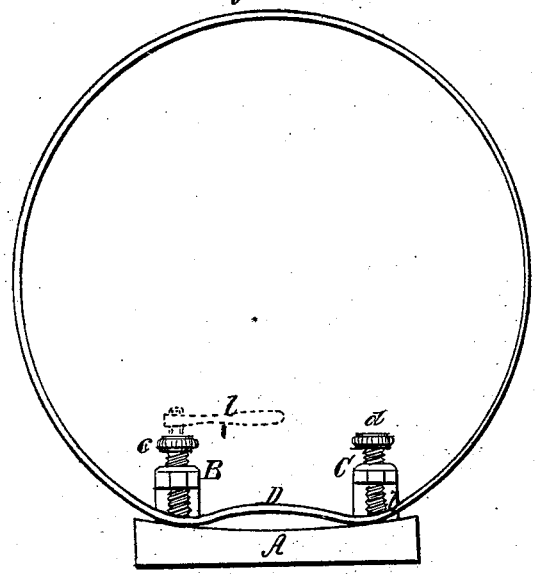
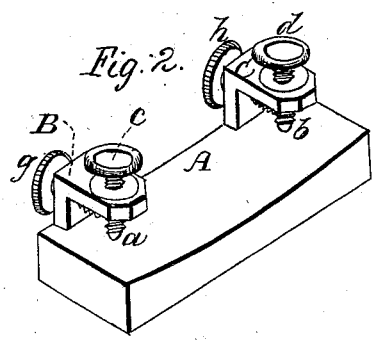
Witnesses;
William A Bull
R. Fitzgerald
Inventor;
Levi Wilkinson

United States Patent Office.

LEVI WILKINSON, OF NEW HAVEN, CONNECTICUT.

Letters Patent No. 70,664, dated November 5, 1867.

IMPROVEMENT IN SHRINKING TIRE.

*The Schedule referred to in these Letters Patent and making part of the same.*

TO ALL WHOM IT MAY CONCERN:

Be it known that I, LEVI WILKINSON, of the city and county of New Haven, in the State of Connecticut, have invented a new and useful Improvement in Shrinking Carriage-Wheel Tire; and I do hereby declare that the following is a full, clear, and exact description of the construction, character, and operation of the same, reference being had to the accompanying drawings, which make part of this specification, in which—

Figure 1 is a plan of the device or apparatus, showing a tire in the position for being shrunk.

Figure 2 is a perspective view of the apparatus ready to receive the tire to be shrunk, showing the binding-screws, &c.

My improvement consists in making a machine or tool of a suitable block, with two brackets, in which I fit two binding-screws, to hold the tire in place while being shrunk, and two gauge-screws, to be used to gauge the tire laterally, when thought best.

I make the block A of wrought iron or any other suitable material, substantially in the form shown in fig. 2, and indicated in longitudinal section in fig. 1, with its centre somewhat depressed to suit the curve of the tire as nearly as may be found convenient. On this block I fit two brackets, as represented at B and C, making the projecting parts so long that the points $a$ and $b$ of the screws $c$ and $d$ will be, at least, so far from the edge as to fall on the lateral centre of the tire, as indicated in fig. 2, and I make the screws of a length and strength to hold the tire firmly in place while being shrunk or reduced with the hammer. If the screw has been turned on a male centre, and its outer surface has been turned conical, it will make the binding power double, that is, so as to act with both male and female centres or points. If thought best, screws may be inserted at the back of each bracket, as shown at $g$ and $h$, to be turned in as gauges for holding the tire, though they are not deemed very material.

I make the heads of the binding-screws with suitable wheels or rims, as $c$ and $d$, for turning them down, or I use a lever or crank, as represented in dots at $l$, fig. 1.

Having made the parts as described, and arranged them as represented in fig. 2, I measure the curved surface of the block A from the point $a$ to the point $b$ of the screws $c$ and $d$, and mark the tire, as at the point $a$, and then measure the length of the tire needed for the wheel, less the distance from $a$ to $b$, and mark it again. I then heat the tire, and bend it inward, as represented at D, fig. 1, until the two marks on the tire correspond with the points $a$ and $b$ of the binding-screws, and, having heated that short portion of the tire to a hammering heat, I place it in the machine and turn down the binding-screws until their points $a$ and $b$ firmly press the tire on to the block A, where they will hold it, at those two points, perfectly immovable. I then hammer that portion of the tire down to the surface of the block A, when the tire will be of the exact length desired. Thus I avoid the trouble of cutting and welding the tire, while the shrinking is done with exact certainty to the measure.

What I claim as my invention, and desire to secure by Letters Patent, is—

The combination of the block A and brackets B and C with the screws $c$ and $d$ and $g$ and $h$, when the whole is constructed and fitted to produce the result, substantially as herein described and set forth.

LEVI WILKINSON.

Witnesses:
R. FITZGERALD,
WILLIAM A. BULL.